United States Patent Office 3,007,977
Patented Nov. 7, 1961

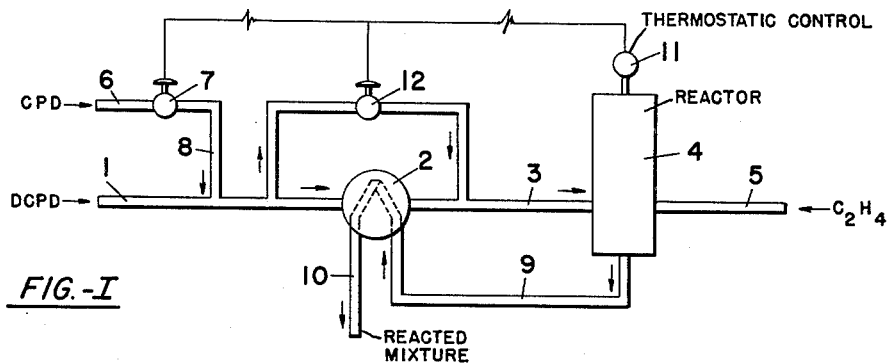
FIG.-I
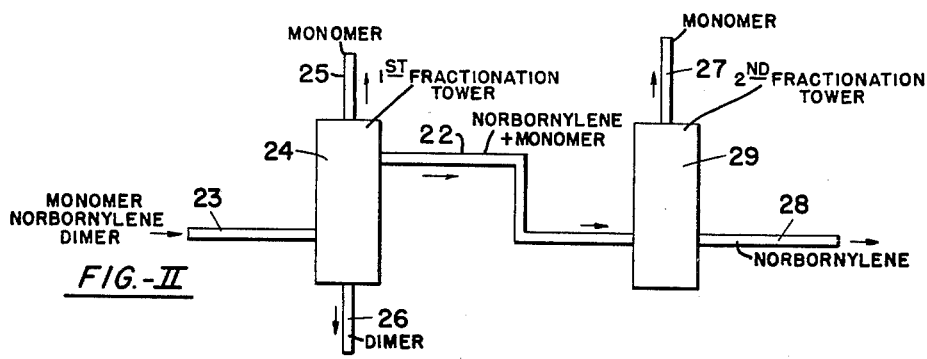
FIG.-II
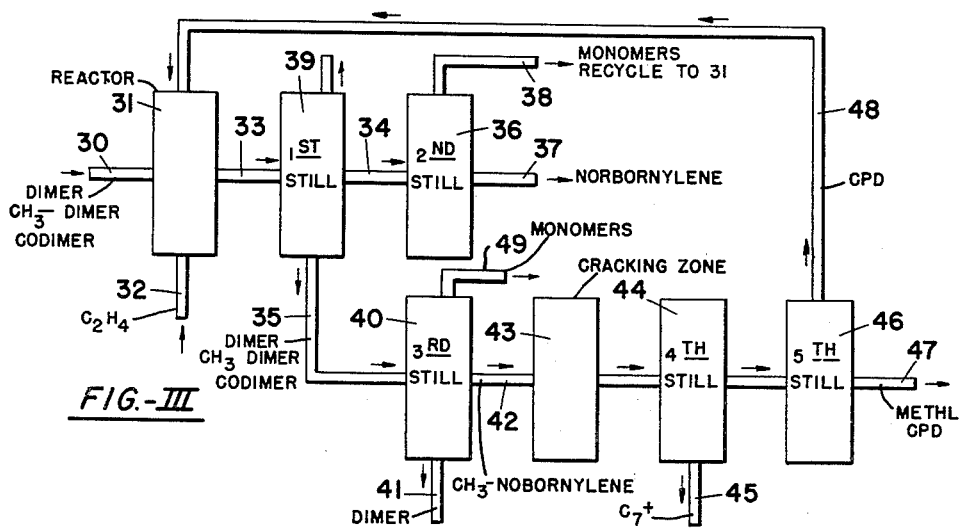
FIG.-III
Arthur B. Hill, Daniel S. Maisel and
Donald W. Wood    INVENTORS

3,007,977
MANUFACTURE OF NORBORNYLENE
Arthur B. Hill, Greenbrook, Daniel S. Maisel, Union, and Donald W. Wood, Westfield, N.J., assignors to Esso Research and Engineering Company, a corporation of Delaware
Filed Sept. 9, 1958, Ser. No. 759,929
10 Claims. (Cl. 260—666)

This invention relates to a process for the preparation of norbornylene from a cyclopentadiene dimer. More particularly, this invention relates to a complete process for the preparation of norbornylene and substituted norbornylenes from cyclopentadiene and substituted cyclopentadiene dimers by a novel technique.

The reaction between ethylene and cyclopentadiene to produce norbornylene or bicyclo (2.2.1)-2-heptene is known in the art as evidenced by the United States patent to Joshel No. 2,349,232. In accordance with the process of this patent, ethylene is reacted with cyclopentadiene at elevated temperatures and pressures to produce norbornylene as represented by the following equation:

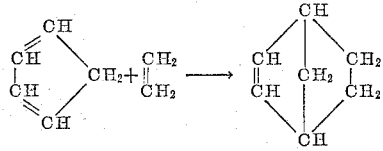

While this reaction is relatively straightforward, in commercial practice many problems exist, making the continuous production of this valuable chemical intermediate difficult. For example, the cyclopentadiene reactant employed by Joshel in the aforesaid patent is unstable even at room temperatures, and tends to dimerize and polymerize in exothermic reactions. Storage of this material thus presents a hazardous condition which has been known to result in explosions and fires. In general, cyclopentadiene is preferably stored as the dimer which is relatively stable at room temperatures. Accordingly, when carrying out the process of Joshel's on a continuous basis, it would first be necessary to crack the dicyclopentadiene under elevated temperatures to obtain the monomer reactant. Further, separation of the unreacted cyclopentadiene from the norbornylene product is complicated. Norbornylene distills intermediate between the heavier boiling cyclopentadiene dimer and the lighter boiling cyclopentadiene monomer. At normal distillation temperatures the dimer and monomer are interconvertible in the sense that the relative amounts of monomer and dimer are continuously approaching their equilibrium values. Purification of the product norbornylene in a conventional manner would thus require costly fractionation equipment.

In accordance with this invention, there is employed as the reactant cyclopentadiene dimer with controlled amounts of cyclopentadiene monomer thereby providing a feed which will automatically aid in controlling the reaction conditions at the desired levels. Further, in accordance with this invention the essentially complete separation of unreacted cyclopentadiene compounds from norbornylene product is carried out. This invention also contemplates the use of impure cyclopentadiene dimer feed containing substantial amounts of methylcyclopentadiene dimer, thereby avoiding the costly process of separating the cyclopentadiene from closely related methylcyclopentadiene.

In accordance with this invention, dicyclopentadiene containing predetermined amounts of cyclopentadiene is reacted with ethylene at elevated temperatures and pressures, to be defined hereinafter, whereby norbornylene is produced. The reaction of ethylene with cyclopentadiene is highly exothermic and would ordinarily require extraneous cooling means such as internal cooling coils, cooling diluent, recycled product or the like. However, under reaction conditions as set forth hereinafter cyclopentadiene dimer cracks to form the cyclopentadiene in an endothermic reaction. The concomitant heats of reaction act to balance each other and to thereby assist in maintaining the temperature of reaction at the desired level. To increase the temperature of reaction, the feed may be raised in monomer concentration; and to decrease the temperature, the monomer concentration may be lowered. Thus, there is provided a system for control of the temperature which may in a commercial plant involve only conventional automatic valves attached to temperature activating devices whereby the ratio of dimer to monomer is automatically regulated. The overall reaction of dicyclopentadiene with ethylene to norbornylene is only slightly exothermic and would require additional heat to maintain the optimum reaction temperatures. The reaction proceeds best at a temperature over 150° C. which is obtained by the addition of monomer. The ease of temperature control is therefore greatly increased by simply varying the ratio of dicyclopentadiene to cyclopentadiene in the feed to the reactor. It is to be understood that it will in many cases be desirable to preheat the feed at least to initiation temperatures rather than to rely solely on the temperatures within the reaction vessel.

The reaction product mixture will comprise the desired norbornylene product, some unreacted cyclopentadiene dimer and unreacted monomer in a ratio determined by equilibrium under the conditions, i.e. temperature, pressure, and total concentration of cyclopentadiene compound maintained. Unreacted cyclopentadiene must be removed in order to purify the product and for the purpose of recycling the cyclopentadiene to the reaction vessel, if desired. The present invention preferably contemplates a two-tower fractionation process. The major portion of the purification occurs in the first tower wherein cyclopentadiene dimer and heavier material are recovered as a high boiling fraction, cyclopentadiene monomer is recovered as a low boiling fraction overhead in dilute concentrations with norbornylene product and concentrated norbornylene product containing small amounts of monomer is recovered as a sidestream between the point of feed entry and the overhead. Taking a dilute monomer concentration overhead with norbornylene inhibits dimerization in the overhead condenser and reflux drum and thereby avoids contamination of the norbornylene sidestream with dimer. The small remaining amounts of cyclopentadiene monomer may be removed overhead in dilute concentration from the product norbornylene in a second tower. Complete separation of the cyclopentadiene compounds from norbornylene in a single tower would be complicated by various factors. Since the norbornylene product obtained from the reaction vessel will comprise, after removal of dissolved ethylene, a mixture of unreacted cyclopentadiene, unreacted dicyclopentadiene and norbornylene, an attempt to separate norbornylene from this mixture in a single vessel would require taking as overhead cyclopentadiene monomer, as bottoms dicyclopentadiene, and as a side stream the norbornylene. While on the surface this may appear to be a satisfactory technique, under the conditions normally required for this fractionation there is constant cracking and redimerization of the cyclopentadiene constituents. Furthermore, for many of the intended uses of norbornylene as a chemical intermediate, even very small quantities of diolefin impurities would be objectionable. Thus, while the dicyclopentadiene may be recovered as bottoms and the monomer as overhead from a single fractionating column, the cyclopentadiene dimer would tend to crack in the lower portion of the column effecting an upward flow of monomer and the monomer would tend to redimerize effecting a downward flow of dicyclopentadiene through the fractionating tower thus contaminating norbornylene containing side stream with both monomer and dimer. By resort to the present two-tower system, contamination of the norbornylene side stream with dimer is avoided and the mixture of monomer and norbornylene may then be distilled to recover cyclopentadiene monomers in dilute concentration from an upper stream and norbornylene product from a lower stream. The operating conditions in both towers as well as the concentration of cyclopentadiene monomers are such as to inhibit redimerization, thus permitting the recovery of relatively pure product. The more costly distillation under vacuum will also assist in reducing the rate of redimerization of monomer.

Another embodiment of this invention contemplates the use of a crude cyclopentadiene stream containing from 10 to 12 carbon atoms per molecule. This stream will comprise as its principal components the dimers of cyclopentadiene and methylcyclopentadiene and the codimer thereof. There may be included other hydrocarbons falling within this boiling range. A stream containing the respective monomers may also be used to control temperature as indicated previously. One purpose of utilizing this crude mixture is to avoid an extensive separation and purification of cyclopentadiene from a crude cut of mixed dimers and codimers. Another purpose is to provide a method of preparing methyl norbornylene concomitantly with norbornylene wherein the products are easily separable. If desired, the methyl norbornylene may be cracked to split off ethylene and to produce methylcyclopentadiene in the event that methyl norbornylene is not a desired product. In this embodiment the dimers of methylcyclopentadiene and cyclopentadiene together with the predetermined amounts of respective monomers are reacted at elevated temperatures and pressures with ethylene to produce a mixture of norbornylene and methyl norbornylenes as well as unreacted cyclopentadiene, methylcyclopentadiene and their dimers and codimers.

As noted above, the feed for the present process may comprise substantially pure cyclopentadienes and cyclopentadiene dimers; however, if it is desired, impure feed streams may be employed. Thus, typical feeds for the present process may stem from steam cracking hydrocarbons to produce the cyclopentadienes and other close boiling olefinic compounds. In general, cyclopentadienes produced by steam cracking are stored in their dimeric form for reasons of safety. It is conventional, for example, to soak the cyclopentadiene containing fraction from a steam-cracking process to produce the dicyclopentadiene and dimethylcyclopentadiene containing products. Although impure cyclopentadienes and cyclopentadiene dimers may be employed, for ease of discussion some of the examples will be set forth employing only relatively pure compounds without regard to other contaminants.

Reaction conditions preferred for the preparation of norbornylene by the reaction of ethylene with cyclopentadiene and/or dicyclopentadiene include 150° to 250° C. Pressures are preferably maintained at 500 to 10,000 p.s.i.g. Ethylene is employed as a gas; however, the reaction takes place in the liquid phase wherein the ethylene is dissolved in the reaction mixture. Hence the pressure must be sufficient to maintain a substantially high ethylene concentration in solution at the temperatures employed. For a given cyclopentadiene monomer concentration, the reaction rate is dependent on the temperature, pressure and ethylene partial pressure; and the residence time may be varied to achieve the degree of conversion desired. The use of a counterflow contacting device with intermediate stages such as is employed in a conventional high pressure absorption column will increase the conversion for the same residence time as that used in a single stage reaction vessel.

For a more complete understanding of the invention, reference may be had to the drawing which depicts various flow diagrams illustrating the invention. FIGURE I shows a flow diagram for the reaction of ethylene with a mixed feed containing controlled amounts of cyclopentadiene monomer and dicyclopentadiene; FIGURE II shows a preferred embodiment for the separation of norbornylene from the reaction product mixture; and FIGURE III represents a flow diagram of a process for the production of norbornylene and methyl norbornylene with a process for the recovery of methylcyclopentadiene and norbornylene from a crude steam-cracked fraction containing cyclopentadiene and methylcyclopentadiene.

In FIGURE I dicyclopentadiene feed is passed via line 1 through a preheater 2 via line 3 into reactor 4 being maintained at 200° C. and elevated pressures, e.g. 500–5000 p.s.i.g. Ethylene is admitted via line 5 in the ratio of at least one mole of ethylene per mole of cyclopentadiene, the dicyclopentadiene for purposes of this ratio being considered as 2 moles of cyclopentadiene. Residence time within the reactor may vary between 2 to 15 hours. A batch, semicontinuous or continuous process may be employed. Cyclopentadiene is fed in controlled quantities via line 6 by valve 7 and via lines 8 and 1 through preheater 2 and into the reactor with the dicyclopentadiene via line 3. Employing a reaction temperature of 200° C. with 3000 p.s.i.g., the mole ratio of cyclopentadiene monomer to dicyclopentadiene dimer is preferably maintained at about .005 to 0.4 to 1 with the preheated mixed feed being passed into the reactor via line 3 at approximately 180° C. depending upon the extent of heat losses to the surroundings. Reaction mixture containing norbornylene, unreacted cyclopentadiene monomer and dimer is taken off as a liquid via line 9, employed to aid in preheating the feed if desired, as shown in preheater 2, and recovered as a cooled product mixture via line 10. The product mixture may then be depressurized and further cooled in order to recover and recycle dissolved ethylene prior to separating norbornylene product. In this figure, there is shown an automatic system for controlling the ratio of cyclopentadiene to dicyclopentadiene. 11 represents a thermostatic control which activates valves 7 and 12. When the temperature within the reactor 4 rises above a predetermined level, e.g. 210° C., valve 7 will close or partially close thereby increasing the ratio of dicyclopentadiene to cyclopentadiene. The thermostatic control may also activate valve 12 which would permit feed to bypass the preheater. If the temperature in the reaction zone drops below the desired level, e.g. 190° C., valve 7 would open and permit a higher ratio of cyclopentadiene to dicyclopentadiene to flow into the reaction zone. Additionally, valve 12 would preferably close whereby all of the feed would pass through the preheat zone. The positioning of the valves and of course the point at which the cyclopentadiene and dicyclopentadiene are mixed may be varied without departing from the intended scope of this invention. For example, the cyclopentadiene monomer and dimer may be separately fed directly into the reactor.

It is to be understood that small amounts of cyclopentadiene may be in the feed with the dicyclopentadiene feed, and similarly small amounts of dicyclopentadiene may be incorporated in the cyclopentadiene feed. The ratio of cyclopentadiene to dimer is not the sole means for regulating temperature control. Extraneous heating or cooling means may be utilized where necessary or desirable. A typical reaction product mixture comprises a composition as follows:

| Component, wt. percent | General | Specific |
|---|---|---|
| Norbornylene | 30 to 90 | 81 |
| Cyclopentadiene | 1 to 5 | 1 |
| Dicyclopentadiene | 1 to 60 | 12 |
| Codimer (Cyclopentadiene-$C_5$ Acyclic diene dimer) | 0 to 10 | 3 |
| Cyclopentadiene trimer and heavier | 0 to 10 | 3 |

If there are present in the reaction mixture $C_4$ and lower boiling hydrocarbons, these components may be removed by a conventional distillation or stripping process not shown.

In FIGURE II the norbornylene containing $C_5$ and heavier fraction is then passed via line 23 into a first fractionating tower or column 24 which may be equipped with numerous plates, e.g. 10 to 40, for a clean separation and will contain the conventional reboiler and reflux equipment not shown. In this column cyclopentadiene monomer in dilute concentration with norbornylene is recovered as a gaseous fraction via line 25 and may be recycled to the reactor, cyclopentadiene dimer with any heavier material present are recovered as a liquid from the bottoms of this tower via line 26, and norbornylene with small amounts of cyclopentadiene monomer is recovered as a liquid sidestream via line 22. The boiling points at atmospheric pressure of cyclopentadiene, norbornylene and dicyclopentadiene are respectively 42° C., 96° C. and 170° C. Conditions within tower 24 should be controlled to effect the desired results; that is, it is preferred to obtain as a sidestream a norbornylene fraction containing no more than 2% cyclopentadiene monomer. The amount of cyclopentadiene monomer taken overhead will be dependent to a considerable extent on the operating conditions in fractionation tower 24. To increase the amount of monomer taken overhead, the bottoms temperature may be raised to crack some of the dimer, and less preferably conditions at the top of the tower may be maintained to permit redimerization of the cyclopentadiene which would then flow downward and thereby reduce the monomer concentration in the overhead stream. Dimerization in the tower may be increased by high reflux ratios to maintain the monomer at elevated temperatures for a substantial period of time.

Cyclopentadiene monomer and dimer are present in the norbornylene product mixture from reactor 4. An attempt to fractionate the product mixture of line 23 in a single tower would result in serious contamination of the norbornylene with the cyclopentadiene dimer due to the continuous redimerization of cyclopentadiene.

The norbornylene containing small amounts of monomer, preferably less than 2%, is then passed via line 22 into a second fractionating tower 29 wherein substantially all of the cyclopentadiene monomer is recovered in dilute concentration overhead as a gaseous fraction via line 27. This stream is suitable for recycle to the reactor or may be refractionated in tower 24 to recover additional norbornylene. Substantially pure norbornylene, i.e. 0.1 wt. percent cyclopentadiene or even less if desired, may be recovered from a lower portion of the fractionating column as a liquid via line 28. If desired, there may be employed a cracking zone to convert additional cyclopentadiene dimer in line 26 to the monomer, or this may be accomplished in the reboiler system of the fractionating column. Typical conditions for the two fractionating columns are as follows:

| Fractionating Column | Bottoms Temperature, ° C. | Top Temperature, ° C. |
|---|---|---|
| 24 | 70 to 180 | 50 |
| 29 | 63 | 50 |

In a third embodiment of this invention, there is employed a crude $C_{10}$–$C_{12}$ fraction comprising cyclopentadiene dimer, methylcyclopentadiene dimer, and a $C_{11}$ codimer of cyclopentadiene and methylcyclopentadiene. This crude cyclopentadiene dimer containing fraction is passed into reactor 31 via line 30 with ethylene via line 32 under the same temperature and pressure conditions noted previously. Cyclopentadiene and/or methylcyclopentadiene may be employed to aid in temperature control. Reaction product is passed via line 33 to fractionation column 39 to split off norbornylene and lower boiling components via line 34 with the heavier components being rejected via line 35. A separation of norbornylene from unreacted cyclopentadiene and methylcyclopentadiene is made in tower 36 with product being recovered as liquid via 37, and lower boiling gaseous fraction being recovered via line 38. The lower boiling fraction is suitable for recycle to the reaction zone. Fractionating columns 39 and 36 are maintained under the conditions set forth in the embodiment which describes FIGURE II of the drawing. The heavier fraction recovered via line 35 and containing the various cyclodiolefin dimers and codimer and methyl norbornylene produced by the reaction of ethylene and methylcyclopentadiene is fractionated in tower 40 to separate the dimer components via 41 and methyl norbornylene via line 42 as a liquid side stream containing very small amounts of cyclopentadiene and methylcyclopentadiene which are unavoidably formed by cracking dimers in the bottom of the tower 40. The largest portion of the monomers thus formed are recovered overhead via line 49 in dilute concentration with methyl norbornylene and may be recycled to tower 36 for further recovery of methyl norbornylene. Methyl norbornylene from 42, if desired, may be recovered as product or cracked in zone 43 at elevated temperatures and low pressures to form methylcyclopentadiene and ethylene. Any $C_7$ and heavier hydrocarbons are rejected from an additional fractionating column 44 via line 45 and methylcyclopentadiene is recovered as a liquid fraction from another distillation zone 46 via line 47. Any cyclopentadiene in the mixture at this point carried through the system may be recycled via line 48 to the reactor 31. Thus, there is presented an integrated process for the production of norbornylene and methyl norbornylene from a crude fraction obtained from a steam-cracking operation which contains the dimers of cyclopentadiene, methylcyclopentadiene and codimer thereof.

For the purpose of setting forth general and specific embodiments of the invention, reference may be had to the following table which refers to the numbers shown in the drawings. The general ranges are applicable to the employment of 50 moles of dimer per hour. The amount of dimer which can be fed in the reactor depends on the plant size and desired product volume.

Table

| Stream or Zone | General | Specific |
|---|---|---|
| 1 (Dimer) Moles per Hour | | 50 |
| 6 (Monomer) Moles per Hour | 0 to 20 | 5 |
| 3 (Total Feed) Temperature, ° C | 130 to 220 | 180 |
| 4 (Reactor) Temperature, ° C | 150 to 250 | 200 |
| 5 (Ethylene) Moles per Hour | 100 to 300 | [1] 250 |
| 10 (Product Mixture)[2]: | | |
|   Norbornylene, wt. percent | 30 to 90 | 81 |
|   Dimer, wt. percent | 1 to 60 | 12 |
|   Monomer, wt. percent | <1 to 5 | 1 |
| 24 (Fractionator): | | |
|   Bottoms Temperature, ° C | 70 to 180 | 120 |
|   Top Temperature, ° C | −50 to 110 | 50 |
|   Pressure, p.s.i.a | 0.2 to 20 | 5 |
| 22 (Monomer Concentration) Wt. Percent | .1 to 5 | 2 |
| 25 (Monomer Concentration) Wt. Percent | 5 to 40 | 25 |
| 27 (Norbornylene concentration) Wt. Percent | 95 to 50 | 80 |
| 28 (Norbornylene purity) Wt. Percent | 95 to 99.9+ | 99.9 |
| 29 (Fractionating Tower): | | |
|   Bottoms Temp., ° C | −2 to 110 | 63 |
|   Top Temperature, ° C | −50 to 110 | 50 |
|   Pressure, p.s.i.a | 0.2 to 20 | 5 |

[1] 84 moles of ethylene to react with cyclopentadiene and the remainder is required to saturate the liquid in reactor 4 with ethylene. The latter portion of ethylene may be recovered and recycled to reactor 4.
[2] After recovery of dissolved ethylene.

What is claimed is:

1. In a process for the production of a norbornylene wherein a cyclopentadiene is reacted in a reaction zone with ethylene at elevated temperature and pressure, the improvement which comprises carrying out the reaction in the presence of cyclopentadiene dimer while at least partially controlling and maintaining the reaction temperature by adjusting the molar ratio of cyclopentadiene monomer to cyclopentadiene dimer in the feed to the reaction zone.

2. A process in accordance with claim 1 wherein said elevated temperatures are 150° to 250° C. and pressures are 500 to 10,000 p.s.i.g.

3. A process for the production of a norbornylene which comprises passing to a reaction zone a cyclopentadiene monomer and a cyclopentadiene dimer, said dimer being present in substantial molar excess of the amount of monomer present also passing ethylene into said reaction zone, maintaining a temperature of 150° to 250° C. and a pressure of 500 to 10,000 p.s.i.g. within said zone, controlling the temperature within said reaction zone at least in part by controlling the molar ratio of cyclopentadiene monomer to cyclopentadiene dimer and recovering a reaction product mixture comprising a norbornylene, a cyclopentadiene monomer and a cyclopentadiene dimer.

4. A process in accordance with claim 3 wherein the ratio of cyclopentadiene monomer to cyclopentadiene dimer is controlled automatically by thermostat means to maintain the temperature within 180° to 220° C.

5. A process for the recovery of norbornylene from a reaction mixture obtained by reacting ethylene with a cyclopentadiene monomer and a cyclopentadiene dimer, said reaction mixture comprising unreacted cyclopentadiene monomer, unreacted cyclopentadiene dimer and norbornylene which comprises fractionating in a first fractionation zone said reaction product mixture to obtain as an intermediate fraction norbornylene with minor amounts of cyclopentadiene monomer and rejecting from said first fractionation zone cyclopentadiene dimer, passing said intermediate fraction obtained from said first fractionation zone containing cyclopentadiene monomer and norbornylene to a second fractionating zone fractionating said intermediate fraction in said second fractionation zone into an overhead fraction comprising cyclopentadiene and norbornylene and a fraction comprising essentially norbornylene, maintaining the concentration of cyclopentadiene in said overhead fraction sufficiently diluted with norbornylene during said fractionation to substantially avoid dimerization of said cyclopentadiene in said second fractionation zone and recovering norbornylene as a liquid fraction therefrom.

6. A process in accordance with claim 5 wherein substantially all of the cyclopentadiene monomer is recovered overhead from said second fractionation zone.

7. A process in accordance with claim 6 wherein the cyclopentadiene containing overhead from said second fractionation zone is reacted with ethylene to obtain additional norbornylene.

8. A process in accordance with claim 6 wherein the overhead from said second fractionating tower is recycled to said first fractionating tower.

9. A process for the production of norbornylene and methyl norbornylene which comprises reacting a feed comprising cyclopentadiene dimer, methylcyclopentadiene dimer, and the codimer of cyclopentadiene and methylcyclopentadiene in the presence of cyclopentadiene and methylcyclopentadiene monomer, the dimers and codimers being present in substantial molar excess of the amount of monomers present, with ethylene to obtain a reaction mixture comprising norbornylene, methyl norbornylene and higher boiling hydrocarbons, rejecting hydrocarbons boiling above methyl norbornylene and separating the remaining methyl norbornylene from norbornylene and lower boiling hydrocarbons.

10. A process in accordance with claim 9 wherein said methyl norbornylene is cracked to produce methylcyclopentadiene suitable for recovery.

References Cited in the file of this patent

UNITED STATES PATENTS

| | | |
|---|---|---|
| 2,340,908 | Thomas | Feb. 8, 1944 |
| 2,349,173 | Joshel | May 16, 1944 |
| 2,349,232 | Joshel | May 16, 1944 |
| 2,372,237 | Ward | Mar. 27, 1945 |
| 2,387,993 | Hepp | Oct. 30, 1945 |
| 2,397,580 | Ward | Apr. 2, 1946 |
| 2,465,950 | Wiss | Mar. 29, 1949 |